(12) United States Patent
Lang et al.

(10) Patent No.: US 8,978,840 B2
(45) Date of Patent: Mar. 17, 2015

(54) ASYMMETRY BRAKE WITH TORQUE LIMIT

(71) Applicant: Hamilton Sundstrand Corporation, Windsor Locks, CT (US)

(72) Inventors: David J. Lang, Rockford, IL (US); Mark D. Miller, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 316 days.

(21) Appl. No.: 13/680,142

(22) Filed: Nov. 19, 2012

(65) Prior Publication Data

US 2014/0138482 A1 May 22, 2014

(51) Int. Cl.
*B60T 7/12* (2006.01)
*B64C 13/28* (2006.01)
*F16D 55/38* (2006.01)
*F16D 65/18* (2006.01)

(52) U.S. Cl.
CPC ............... *B64C 13/28* (2013.01); *F16D 55/38* (2013.01); *F16D 65/186* (2013.01)
USPC ........................................... 188/134

(58) Field of Classification Search
USPC ........ 188/180, 187, 166, 163, 72.7, 71.5, 134
See application file for complete search history.

(56) References Cited

U.S. PATENT DOCUMENTS

| | | | |
|---|---|---|---|
| 4,603,594 A | 8/1986 | Grimm | |
| 4,685,550 A | 8/1987 | Metcalf | |
| 4,779,822 A | 10/1988 | Burandt et al. | |
| 5,137,126 A | 8/1992 | Magnaval et al. | |
| 5,484,043 A | 1/1996 | Quick et al. | |
| 6,196,361 B1 | 3/2001 | Russ et al. | |
| 6,202,803 B1 * | 3/2001 | Lang .............................. | 188/134 |
| 6,752,248 B2 | 6/2004 | Berwanger | |
| 7,114,601 B2 * | 10/2006 | Mayer et al. ................... | 188/134 |
| 8,058,757 B2 | 11/2011 | Himelmann | |
| 8,262,531 B2 | 9/2012 | Himmelmann et al. | |
| 8,393,442 B2 * | 3/2013 | Lang et al. ...................... | 188/134 |
| 2010/0038493 A1 | 2/2010 | Lang et al. | |

* cited by examiner

*Primary Examiner* — Brian M O'Hara
*Assistant Examiner* — Michael Kreiner
(74) *Attorney, Agent, or Firm* — Carlson, Gaskey & Olds, PC

(57) ABSTRACT

An electric fail-safe is operable to move a first ramp between distinct positions. The first ramp is associated with the second ramp. There are balls intermediate the first and second ramps. When the electric fail-safe brake is in an actuated condition, the second ramp forces stationary brake disks to engage rotating brake disks which rotate with a shaft to cause braking of the shaft. There is a keeper associated with the second ramp which abuts a stop surface to limit the amount of torque applied to the rotary and stationary disks after a predetermined amount of braking force has occurred. A brake with a test switch is also disclosed.

17 Claims, 2 Drawing Sheets

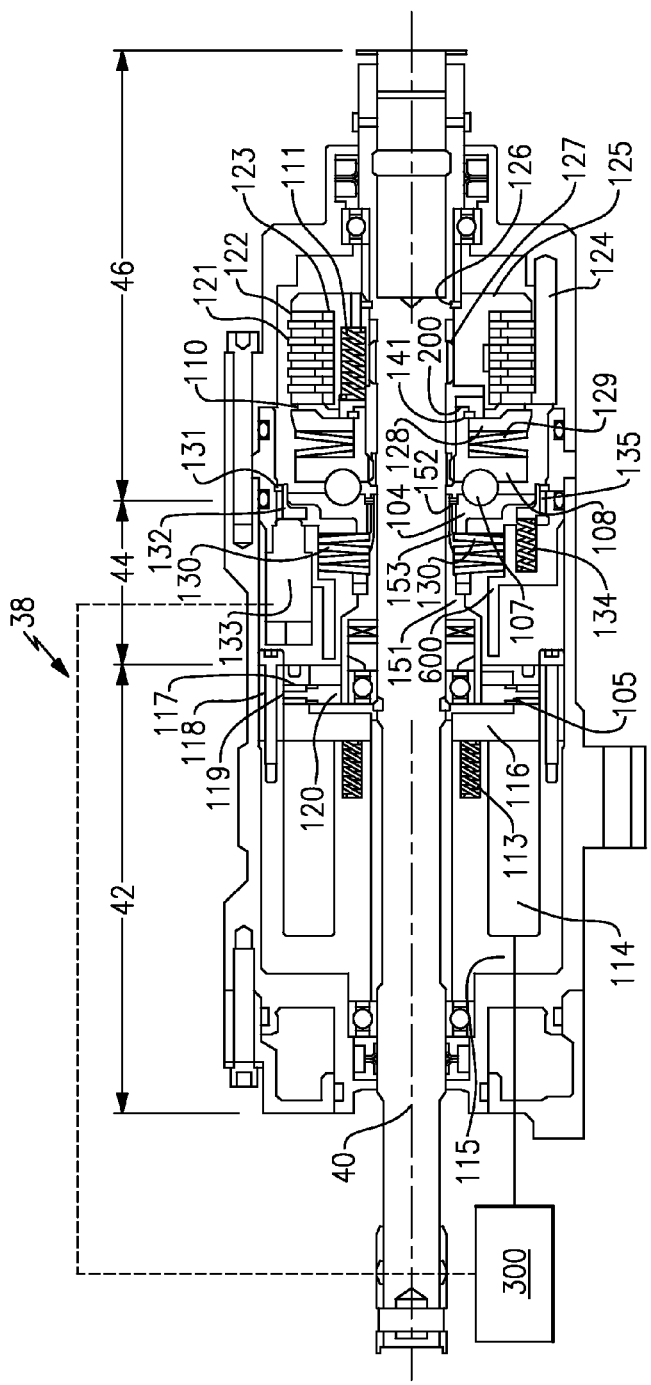
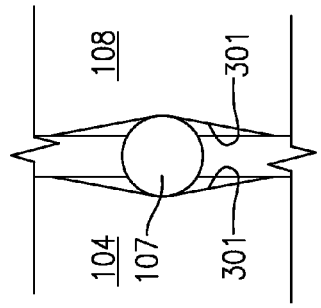

ASYMMETRY BRAKE WITH TORQUE LIMIT

BACKGROUND OF THE INVENTION

This application relates to a brake that operates to prevent rotation of a shaft, when relative rotation is detected between two points that should be driven together.

Modern systems are requiring increasingly precise and complex controls. One such system is a system for driving flaps or slats on an aircraft wing. A drive actuator typically drives shafts extending in each of two lateral directions, which in turn, drive actuators for pivoting the flaps and slats as needed. It is desirable that these actuators are all driven as one.

Thus, it is known to put location sensors at each end of the two drive shafts. If relative rotation is detected, then an assumption is made that there has been a disconnect or break somewhere between the drive actuator and the two shaft ends.

In such an instance a brake is provided to stop further rotation of the shaft. In one known brake, an electric fail-safe unit is deactivated. When the fail-safe brake is provided with current, it acts to release a primary brake. However, when current is stopped then the brake is actuated. The brake may consist of a plurality of disks.

SUMMARY OF THE INVENTION

A brake for incorporation into a mechanical movement system has an electric fail-safe brake that may be provided with power, or disconnected from power, and is operable to move a first ramp between distinct positions when provided with power in a first condition and when not provided with power in a second condition. The first ramp is associated with the second ramp. There are balls intermediate the first and second ramps. When the electric fail-safe brake is in an actuated one of said first and second conditions, the second ramp forces stationary brake disks to engage rotating brake disks which rotate with a shaft to cause braking of the shaft. There is a keeper associated with the second ramp which abuts a stop surface. The stop surface is abutted by the keeper of the second ramp to limit the amount of torque applied to the rotary and stationary disks after a predetermined amount of braking force has occurred. A mechanical system incorporating such a brake is also disclosed. A brake being provided with a test switch is also disclosed.

These and other features may be best understood from the following drawings and specification.

BRIEF DESCRIPTION OF THE DRAWINGS

FIG. 2 shows a brake.
FIG. 3A shows a portion of the brake in a non-engaged position.
FIG. 3B shows the engaged position.

DETAILED DESCRIPTION

Figure 1:
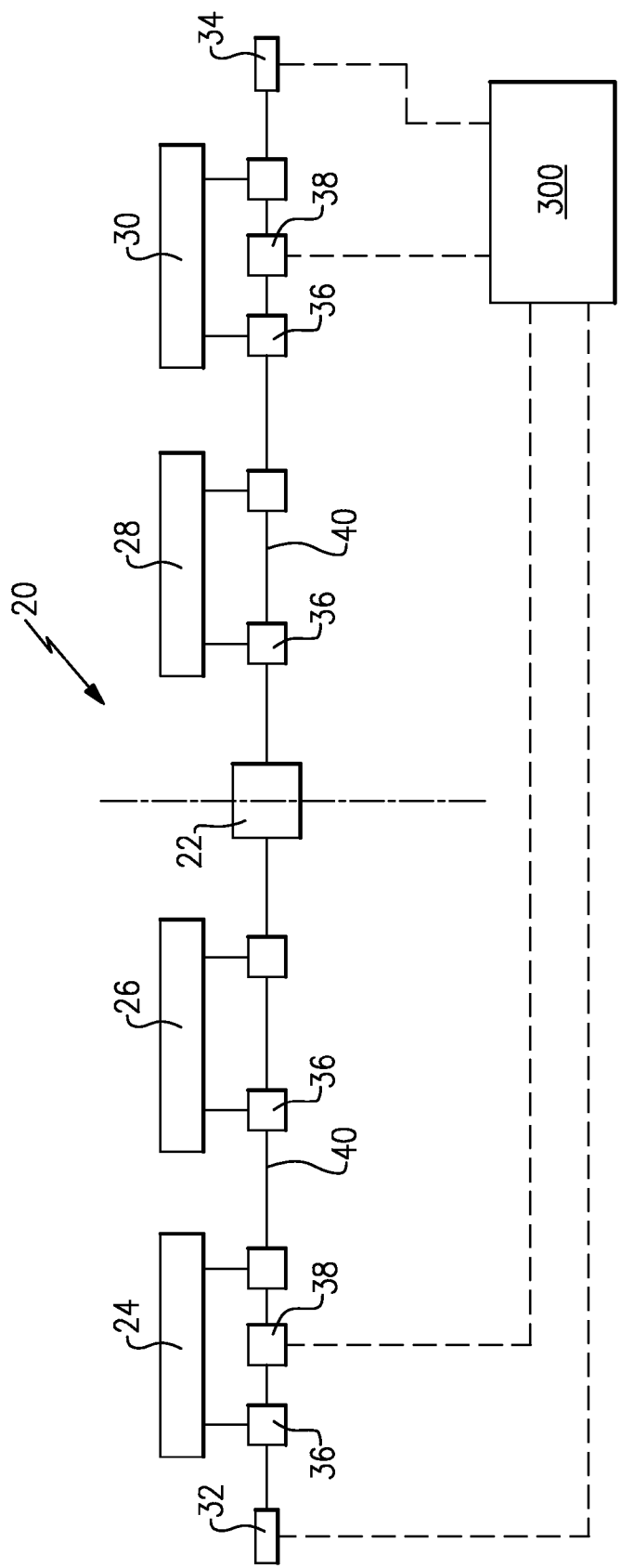
FIG. 1 shows an actuation system for flaps in an aircraft.

A mechanical drive system 20 is illustrated in FIG. 1 having a power drive unit 22, which may be a rotary motor. The drive unit 22 drives a shaft 40 extending in each of two lateral directions, such as through the wings of an associated aircraft. There are a plurality of flaps 24, 26, 28 and 30 each driven by actuators 36 which are ultimately driven by the drive unit 22. Position sensors 32 and 34 sense relative rotation at ends of shaft 40. If a position signal between the sensors 32 and 34 differ, then a determination is made that there has been a disconnect or break somewhere along one of the shafts 40. The sensors 32 and 34 communicate with a control 300. Brakes 38 are illustrated associated with ends of the shafts 40 and are actuated should the control 300 determine that there has been a disconnect or break due to the position sensor information from sensors 32 and 34.

The brakes 38 are shown in more detail in FIG. 2.

Brake 38 includes an electric fail-safe brake portion 42, an electric switch pack 44, and a braking section 46. The brake is capable of holding system torque by engaging a ball ramp between ramps 104 and 108, as will be explained below. The brake is engaged by applying torque to an output ball ramp 104 by de-energizing the electric brake 42. The electric brake engages a self-contained friction plate 105 that is connected to the output ball ramp 104. By applying torque to the output ball ramp 104 through the electric brake 42, the ball ramp 104 is held stationary as an input shaft 40 continues to rotate.

This drives balls 107 between the output ball ramp 104 and a ball ramp 108 to separate, or increase a distance between the two ramps 104 and 108 (see FIGS. 3A and FIG. 3B). As shown in FIG. 3A, the ramps 104 and 108 are in a non-engaged position, and the ball 107 sits at a most distant portion between surfaces 301. In this position there is clearance. However, when the balls are driven by de-energizing the electric brake 42, the ball 107 moves to a position such as shown in FIG. 3B where it is no longer at the most distant position, and there is no clearance. With this movement, the ramp 108 is forced to the right and engages a plurality of brake disks.

A set of springs 111 preload the ball 107 and ball ramps 104 and 108 together upon the disengagement of the electric fail-safe brake portion 42. Input torque translates the ball ramps 104/108 axially against the preload spring 111, upon the movement of the balls 107 explained above.

The pilot brake or electric fail-safe brake portion 42 will be described. When electric power is removed, such as from control 300, springs 113 force brake plates together, as explained below to apply the brake. A brake solenoid consists of an electric coil 114 inside an iron cavity 115. A magnetic force is created by providing power to the electric coil 114 from control 300. This pulls a clapper plate 116 toward the iron cavity 115, overcoming the preload in the springs 113. This releases the brake as will be described below.

When power is removed from the coil 114, the springs 113 then apply a force to the clapper plate 116, pushing it into contact with a friction plate 105, which then contacts a grounding plate 117. The grounding plate 117 is held in place by end bolts 118. End bolts 118 clamp across sleeves 119 to the iron cavity 115. The sleeves 119 react torque from the clapper plate 116 through grooves in the clapper plate 116.

The primary brake portion 46 is a multi-plate ball ramp brake. As mentioned, when the pilot brake 42 is disconnected from power, it grounds the output ball ramp 104. A spline 120 allows shaft misalignment between a friction plate 105 and the output ball ramp 104. The primary brake portion 46 is then engaged by rotating input shaft 40 and compressing spring 111, due to the balls 107 rolling up the ball ramps 104 and 108, and along the facing surfaces 301, as explained above.

When the ball ramp 108 is forced to the right, it removes clearance 110 between rotating frictional plates 122 and stationary plates 121 in the brake section 46. This applies the primary brake 46 and prevents further rotation of the shaft 40.

Friction plate 122 is connected to a hub 125 by a spline 123. The stationary plates 121 are connected to a ground by a pin 124. Hub 125 is secured to shaft 40 by a retaining ring 126 and a spline 127.

When the balls 107 roll up ramps 104 and 108, the ramp motion is limited by a keeper 128, having an end 200, contacting the hub 125.

At this point the clearance 110 is removed from the brake section 46, and springs 129 have been compressed farther than in an initial preload condition. The initial preload is provided by keeper 128 and retaining ring 141 assembled onto ball ramp 108 compressing springs 129. Any further ball 107 load increase resulting from torque is then transferred to the hub 125 through the keeper 128, without passing through the brake section 46. Thus, the amount of brake torque is limited in this embodiment.

The operation of the brake 38 other than the torque limit as mentioned above may be generally as disclosed in co-pending U.S. patent application Ser. No. 12/228,595, titled "High Gain Asymmetry Brake" and owned by the assignee of this application. Aspects of the operation of the brake disclosed in that application are incorporated herein by reference.

However, the present application provides the limit on the brake torque function as mentioned above.

In addition, the electric switch pack 44 is included in this application, and is not in the above-mentioned application.

The brake torque capacity for the brake 38 may be checked while an associated aircraft is on the ground by applying torque to the brake 38 from the system power drive unit 22 with the fail safe brake portion 42 engaged. As torque is applied to the brake 38, system controller 300 monitors the trip point of an electrical switch pack provided by electric switches 133. This is sent to the control 300 along with the position of the system through the position sensors.

As the ball 107 roll up the ramps 104 and 108, the ramp 104 compresses springs 130 beyond their initial preload, and moves axially to contact plate 132, which is grounded proportionally through a spline 135. The initial preload of springs 130 is accomplished by securing ball ramp 104 and springs 130 onto shaft 151 by retaining ring 152 and spline 153. After sufficient movement, a plate 132 will contact and trip the switch 133. Plate 132 is preloaded by a number of springs 134 against a retaining ring 131 in the housing 600. The springs 134 are equally spaced around the circumference of Plate 132. When the switch 133 is tripped, the controller 300 will be able to evaluate how much movement of the system was required to ensure that this asymmetry brake 38 is properly functioning.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A brake for incorporation into a mechanical movement system comprising:
an electric fail-safe brake that may be provided with power, or disconnected from power, and said electric fail-safe brake being operable to move a first ramp between distinct positions when provided with power in a first condition and when not provided with power in a second condition, and said first ramp being associated with a second ramp, and there being balls intermediate said first and second ramps, and wherein when said electric fail-safe brake is in an actuated one of said first and second conditions, said second ramp forces stationary brake disks to engage rotating brake disks which rotate with a shaft to cause braking of the shaft; and
there being a keeper associated with said second ramp which abuts a stop surface to limit the amount of torque applied to said rotary and stationary disks after a predetermined amount of braking force has occurred;
wherein a hub is associated with said shaft and a ramp spring biases said second ramp away from said hub with said keeper limiting the amount of compression of said ramp spring.

2. The brake as set forth in claim 1, wherein a spring biases said second ramp away from an actuated position and movement of said balls along surfaces between said first and second ramps causing said second ramp to move away from said first ramp and engage said brake.

3. The brake as set forth in claim 1, wherein said electric fail-safe brake is in said second condition when actuated.

4. The brake as set forth in claim 1, wherein said brake is provided with a switch, and said switch is actuated when braking has occurred, and said switch communicating with a control, and said switch providing a test signal that said brake is operating properly.

5. The brake as set forth in claim 4, wherein said first ramp moves against a test spring force upon engagement of the brake to actuate said switch.

6. A brake for incorporation into a mechanical movement system comprising:
an electric fail-safe brake that may be provided with power, or disconnected from power, and said electric fail-safe brake being operable to move a first ramp between distinct positions when provided with power in a first condition and when not provided with power in a second condition, and said first ramp being associated with the second ramp, and there being balls intermediate said first and second ramps, and wherein when said electric fail-safe brake is in an actuated one of said first and second conditions, said second ramp forces stationary brake disks to engage rotating brake disks which rotate with a shaft to cause braking of the shaft; and
said brake being provided with a switch, and said switch being actuated when braking has occurred, and said switch communicating with a control and providing a test signal that said brake is operating properly;
wherein said first ramp moves against a test spring force upon engagement of the brake to actuate said switch.

7. A mechanical movement system comprising:
a plurality of elements driven by a common drive, a sensor for sensing a failure of said drive to drive all of the elements at a common speed, and said sensor sending a signal to a control, said control actuating a brake when the sensor senses the failure;
the brake including an electric fail-safe brake that may be provided with power, or disconnected from power, and said electric fail-safe brake being operable to move a first ramp between distinct positions when provided with power in a first condition and when not provided with power in a second condition, and said first ramp being associated with the second ramp, and there being balls intermediate said first and second ramps, and wherein when said electric fail-safe brake is in an actuated one of said first and second conditions, said second ramp forces stationary brake disks to engage rotating brake disks which rotate with a shaft to cause braking of the shaft; and
there being a keeper associated with said second ramp which abuts a stop surface to limit the amount of torque applied to said rotary and stationary disks after a predetermined amount of braking force has occurred;

wherein a hub is associated with said shaft and a ramp spring biases said second ramp away from said hub with said keeper limiting the amount of compression of said ramp spring.

8. The system as set forth in claim 7, wherein a spring biases said second ramp away from an actuated position and movement of said balls along surfaces between said first and second ramps causing said second ramp to move away from said first ramp and engage said brake.

9. The system as set forth in claim 7, wherein said electric fail-safe brake is in said second condition when actuated.

10. The system as set forth in claim 7, wherein said brake is provided with a switch, and said switch is actuated when braking has occurred, and said switch communicating with a control, and said switch providing a test signal that said brake is operating properly.

11. The system as set forth in claim 10, wherein said first ramp moves against a test spring force upon engagement of the brake to actuate said switch.

12. The system as set forth in claim 7, wherein said common drive drives shafts in each of two opposed directions to in turn drive said plurality of elements.

13. The system as set forth in claim 12, wherein said sensor includes a sensor associated with at least each of said shafts, and said sensors comparing rotational speeds and shaft positions to sense a failure of the drive to drive all of said elements at said common speed.

14. The system as set forth in claim 13, wherein said elements include aircraft components.

15. The system as set forth in claim 14, wherein said aircraft components include flaps or slats.

16. The system as set forth in claim 7, wherein said elements are aircraft components.

17. The system as set forth in claim 16, wherein said aircraft components are flaps or slats.

* * * * *